3,652,771
QUATERNARY AMMONIUM COMPOUNDS USED TO CONTROL BACTERIA IN HARD WATER

Reginald L. Wakeman, Philadelphia, Pa., and John J. Merianos, Jersey City, N.J., assignors to Millmaster Onyx Corporation, New York, N.Y.
No Drawing. Filed Aug. 1, 1969, Ser. No. 846,970
Int. Cl. A01n 9/20
U.S. Cl. 424—329                3 Claims

ABSTRACT OF THE DISCLOSURE

The mixture of dodecyl dimethyl 2,4,6-trimethylbenzyl ammonium chlorides or bromides with tetradecyl dimethyl 2,4,6-trimethylbenzyl ammonium chlorides or bromides form a synergistic blend having a higher degree of microbiocidal activity in hard water than either compound by itself.

---

This invention relates to microbiocidal quaternary ammonium products, and it particularly relates to products of this type having a high degree of microbiocidal activity in hard water.

In accordance with the present invention, an unexpectedly high degree of microbiocidal activity in hard water is obtained with a blend of two quaternary ammonium chlorides or bromides where the quaternary ammonium cation of each quaternary component is alkyl dimethyl 2,4,6-trimethylbenzyl ammonium, and wherein the alkyl group in one case is $C_{12}$ and in the other is $C_{14}$. The proportion of the dodecyl to the tetradecyl compound should be between about 90/10 and 10/90 parts by weight. The preferable range is between about 80/20 and 55/45 parts by weight.

When the $C_{12}$ and $C_{14}$ compounds are both present in significant amounts, there is a completely unexpected synergism. However, if any significant amounts of any other alkyl dimethyl 2,4,6-trimethylbenzyl ammonium compounds are present, where the alkyl groups are different, this synergism is either partially or totally destroyed.

The above does not exclude possible insignificant amounts (of perhaps 1% to 9% by weight) of other substances which would be present as impurities.

The term "hard water" is generally used to describe water having at least about 75 p.p.m. of calcium carbamates or equivalent salts.

The following examples illustrate the invention without any intent, however, to limit the invention except as claimed.

EXAMPLE 1

Dodecyl dimethyl 2,4,6-trimethyl benzyl chloride in crystalline form was prepared in the following manner:

A 500 ml. three-neck flask equipped with an agitator and a reflux condenser was charged with 0.25 mol or 57.5 grams of dodecyl dimethylamine, 0.25 mol or 41.25 grams of 2,4,6-trimethylbenzyl chloride, and 150 ml. of acetone. The mixture was agitated gently while heating it on a steam bath between 50° and 80° for one hour. After fifteen minutes, a white solid began to separate out, and the rate of stirring was reduced to a minimum.

After one hour, the mixture was allowed to cool to room temperature, whereupon the product crystallized out. The mass was filtered and the product was washed with a little acetone and dried.

86.25 grams of white, crystalline dodecyl dimethyl 2,4,6-trimethylbenzyl ammonium chloride, or 91% of the theoretical amount was obtained. It assayed 99% active and had a melting point of 164.5°–169° C.

EXAMPLE 2

In a similar manner as in Example 1, tetradecyl dimethyl amine and 2,4,6-trimethylbenzyl chloride were reacted in acetone, to yield 94.75 grams of white crystals or 92.5% of the theoretical of tetradecyl dimethyl 2,4,6-trimethylbenzyl ammonium chloride of 99.3% activity, melting at 162.0°–164.5° C.

EXAMPLE 3

In the same way as in Example 1, hexadecyl dimethylamine and 2,4,6 - trimethylbenzyl ammonium chloride were reacted in acetone to yield 97.25 grams or 88.5% of the theoretical, of white crystals assaying 98.4% active, with a melting point of 159.0°–159.5° C.

EXAMPLE 4

In the same manner as in the preceding examples, a mixture of 70% dodecyl and 30% tetradecyl dimethylamines, by weight, was reacted with an equivalent amount of 2,4,6-trimethylbenzyl chloride. White crystals with a waxy feel, of the mixed dodecyltetradecyl dimethyl 2,4,6-trimethyl benzyl ammonium chlorides were obtained in the amount of 77.25 grams or 79% of the theoretical, assaying 98.4% activity, and melting at 156.5°–161° C.

EXAMPLE 5

The above products were also prepared as 50% aqueous solutions, by reacting the respective amines with 98% of the equivalent amount of 2,4,6-trimethylbenzyl chloride, in the presence of an equal weight of water containing an alcohol, such as ethanol, sufficient to amount to about 10% of the solution of the product. The reactions were conducted in an agitated flask under reflux at 80°–100° C. for about one hour, at the end of which time the reaction to form the mixed alkyl dimethyl trimethylbenzyl ammonium chlorides was essentially complete.

EXAMPLE 6

The above products may also be prepared as the corresponding bromide salt, by substituting 2,4,6-trimethylbenzyl bromide for the trimethylbenzyl chloride. Or they may be prepared by other methods well known to the art, for example, by the reaction of the respective long chain alkyl bromides with dimethyl 2,4,6-trimethylbenzyl amine, or by the reaction of methyl bromide with alkyl dimethyl 2,4,6-trimethylbenzylamines.

EXAMPLE 7

The above products were tested bacteriologically by the A.O.A.C. Germicidal and Detergent Sanitizers test method as given in the "Methods of Analysis of the Association of Official Analytical Chemists," 10th edition, published by that organization in 1965, pages 87–89. The test employs synthetic hard water at varying degrees of hardness expressed in terms of parts per million as calcium carbonate. The test organism was *Escherichia coli* ATCC #11229. Standard effectiveness, based on replicate tests, calls for 99.999% reduction in the count of the organisms within 30 seconds. In each case, the concentration of the quaternary ammonium compound was at the level of 200 parts per million.

Hard-water tolerance, alkyl dimethyl 2,4,6-trimethyl benzyl ammonium chlorides

| Alkyl: | H.W.T., p.p.m. |
|---|---|
| $C_{12}$ | 900 |
| $C_{14}$ | 1,000 |
| $C_{16}$ | 600 |
| 70/30, $C_{12}/C_{14}$ | 1,200 |

Thus, surprisingly, mixing the $C_{12}$ and $C_{14}$ homologs result in a marked increase in the hard water tolerance over that of either component. While the $C_{14}$ compound alone is more effective than the $C_{12}$ homolog alone, the $C_{16}$ homolog falls off sharply.

The invention claimed is:

1. A bacteriocidal composition consisting essentially of a blend of dodecyl dimethyl 2,4,6-trimethylbenzyl ammonium chloride and tetradecyl dimethyl 2,4,6-trimethylbenzyl ammonium chloride, wherein the proportion of the dodecyl compound to the tetradecyl compound is between about 90/10 and 55/45 parts by weight.

2. An aqueous bacteriocidal solution wherein the water is hard water and wherein there is present a bacteriocidally effective amount of a composition consisting essentially of a blend of dodecyl dimethyl 2,4,6-trimethylbenzyl ammonium chloride and tetradecyl dimethyl 2,4,6-trimethylbenzyl ammonium chloride, wherein the proportion of the dodecyl compound to the tetradecyl compound is between about 90/10 and 55/45 parts by weight.

3. A method of reducing the level of bacteria in hard water which comprises applying to said bacteria, a bacteriocidally effective amount of a composition consisting essentially of a blend of dodecyl dimethyl 2,4,6-trimethylbenzyl ammonium chloride and tetradecyl dimethyl 2,4,6-trimethylbenzyl ammonium chloride, wherein the proportion of the dodecyl compound to the tetradecyl compound is between about 90/10 and 55/45 parts by weight.

References Cited
UNITED STATES PATENTS

| | | | |
|---|---|---|---|
| 2,700,683 | 1/1955 | Tesoxo et al. | 424—329 X |
| 3,285,959 | 11/1966 | McFarlane | 424—329 X |
| 3,223,644 | 12/1965 | Law | 424—329 X |

ALBERT T. MEYERS, Primary Examiner

L. SCHENKMAN, Assistant Examiner